United States Patent
Naim et al.

(10) Patent No.: US 9,603,042 B1
(45) Date of Patent: Mar. 21, 2017

(54) SELECTION OF WIRELESS DEVICES FOR MEASUREMENT REPORTS

(71) Applicant: Sprint Spectrum LP, Overland Park, KS (US)

(72) Inventors: Muhammad Naim, Sterling, VA (US); Chunmei Liu, Great Falls, VA (US); Daniel Vivanco, Sterling, VA (US); Shahzada Rasool, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/640,205

(22) Filed: Mar. 6, 2015

Related U.S. Application Data

(63) Continuation of application No. 13/760,740, filed on Feb. 6, 2013, now Pat. No. 9,014,040.

(51) Int. Cl.
  *H04W 24/10* (2009.01)
  *H04W 72/12* (2009.01)
  *H04L 1/00* (2006.01)

(52) U.S. Cl.
  CPC .......... *H04W 24/10* (2013.01); *H04L 1/0003* (2013.01); *H04W 72/1263* (2013.01)

(58) Field of Classification Search
  CPC .. H04W 24/10; H04W 72/1263; H04L 1/0003
  See application file for complete search history.

(56) References Cited

U.S. PATENT DOCUMENTS

| | | | |
|---|---|---|---|
| 2006/0281462 A1* | 12/2006 | Kim | H04W 36/30 455/436 |
| 2008/0153483 A1 | 6/2008 | Abu-Amara | |
| 2008/0207122 A1* | 8/2008 | Ahn | H04L 1/0015 455/39 |
| 2009/0252113 A1* | 10/2009 | Take | H04W 36/30 370/331 |
| 2009/0325578 A1* | 12/2009 | Li | H04W 36/0055 455/436 |
| 2011/0028181 A1 | 2/2011 | Byun et al. | |
| 2011/0039564 A1 | 2/2011 | Johnstone et al. | |
| 2011/0053598 A1 | 3/2011 | Ahluwalia et al. | |
| 2011/0176424 A1 | 7/2011 | Yang et al. | |
| 2011/0281583 A1 | 11/2011 | Hole | |
| 2012/0135778 A1* | 5/2012 | Tian | H04L 1/0003 455/522 |

* cited by examiner

*Primary Examiner* — Chi H Pham
*Assistant Examiner* — Weibin Huang

(57) ABSTRACT

A database is maintained that maps source cell regions to channel condition on the neighbor cell(s) coverage. The database also tracks whether the neighbor cell has better, weaker, or similar signal strength than the source cell. The channel condition and bitrate requirement of each wireless device being served by the source cell are also tracked. Once a particular neighbor cell has been selected for traffic offload (i.e., handover of one or more wireless devices), the source cell uses the database to select which wireless devices should send measurement reports. Those wireless devices with channel conditions that are mapped in the database to the target cell's coverage are designated for possible selection. Among these wireless devices, either the wireless devices with the highest or lowest bitrate requirements are selected to provide measurement reports for the target cell.

12 Claims, 4 Drawing Sheets

SELECTION OF WIRELESS DEVICES FOR MEASUREMENT REPORTS

This patent application is a continuation of U.S. application Ser. No. 13/760,740, filed on Feb. 6, 2013.

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Elements of these wireless networks (e.g., access nodes or "cells") may become overloaded with, for example, too many users (i.e., wireless devices), or too much data. When this happens, the wireless network may take actions that help prevent a noticeable degradation in the quality of service being provided to users. These actions can include "load balancing" or "traffic management" which distributes/redistributes work among network elements in order to help prevent degraded or lost service.

Load balancing and/or traffic management procedures can include load equalization, offloading and pre-emption due to call admission control. These procedures may include the process of handing off (or handing over) a wireless device from a cell with low available capacity (Source) to a neighbor cell with a relatively higher available capacity (Target).

OVERVIEW

In an embodiment, a method of selecting a wireless device being served by a first access node to send a measurement report includes storing, in a database, an association between a second access node and a first indicator of bits transmitted per physical resource block (PRB). The database is queried with second indicator of bits transmitted per PRB. The second indicator of bits transmitted per PRB is associated with the wireless device. In response to the query, it is determined that the wireless device may be in a coverage area of the second access node. A stored indicator of signal strength of the second access node is received. Based on the stored indicator of signal strength, and an indicator of required bit rate associated with the wireless device, the wireless device is selected to measure a signal strength of the second access node.

In an embodiment, a communication system includes a first access node configured to communicate with a plurality of wireless devices. The plurality of wireless devices include a first wireless device. This first wireless device is associated with a first indicator of bits transmitted per physical resource block (PRB). The communication system also includes a processing node configured to store an association between a second access node and a relative signal strength between the second access node and the first access node. The processing node queries a database with the first indicator of bits transmitted per PRB. In response to the query, the processing node receives an indicator that the wireless device is in a coverage area of the second access node. Based on a stored relative signal strength and a required bit rate associated with the wireless device, the first access node instructs the wireless device to measure a signal strength of the second access node.

In an embodiment, a method of operating a communication system includes using a source access node to communicate with a plurality of wireless devices. The plurality of wireless devices including a first wireless device and a second wireless device. A database that maps bits transmitted per physical resource block (PRB) to coverage of a target access node is maintained. A relative signal strength parameter is associated with the target access node. The current bits per PRB indicators and minimum required bitrate indicators are tracked for each of the plurality of wireless devices. A subset of the plurality of wireless devices are selected to provide measurement reports based on the relative signal strength parameter and the minimum required bitrate indicators.

DETAILED DESCRIPTION

In an embodiment, a database is maintained that maps source cell regions to channel condition on the neighbor cell(s) coverage. The database also tracks whether the neighbor cell has better, weaker, or similar signal strength than the source cell. The channel condition and bitrate requirement of each wireless device being served by the source cell are also tracked.

Once a particular neighbor cell has been selected for traffic offload (i.e., handover of one or more wireless devices), the source cell uses the database to select which wireless devices should send measurement reports. Those wireless devices with channel conditions that are mapped in the database to the target cell's coverage are designated for possible selection. Among these wireless devices, either the wireless devices with the highest or lowest bitrate requirements are selected to provide measurement reports for the target cell. Those wireless devices with the highest bitrate requirements are selected if the target cell has better or similar signal strength as the source cell. Those wireless devices with the lowest bitrate requirements are selected if the target cell has weaker signal strength than the source cell. In this manner, only a subset of the wireless devices being served by the source cell is asked to provide measurement reports.

Figure 1:
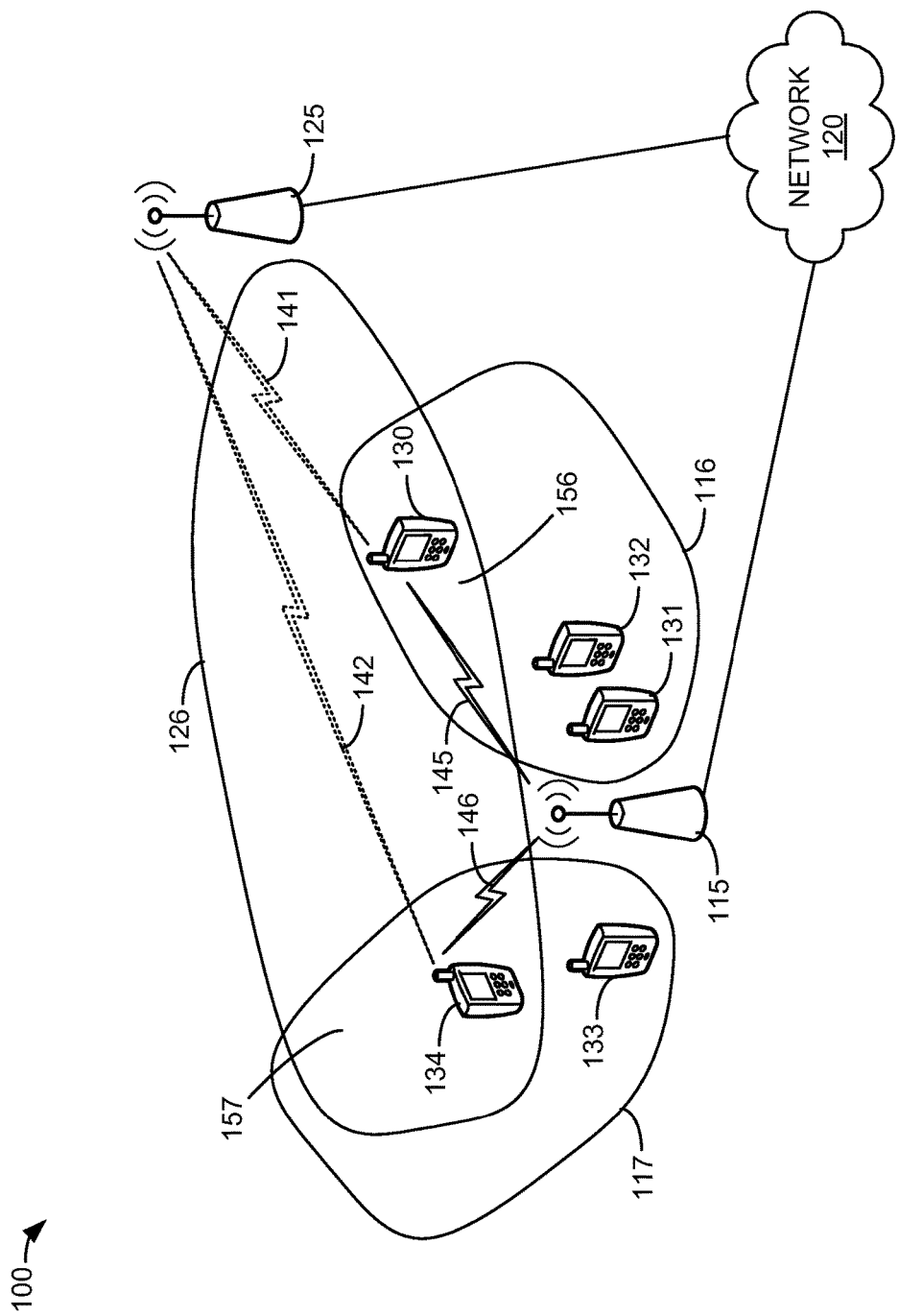
FIG. 1 is a block diagram of a communication system.

FIG. 1 is a block diagram illustrating a communication system. In FIG. 1, communication system 100 comprises access node 115, access node 125, network 120, wireless device 130, wireless device 131, wireless device 132, wireless device 133, and wireless device 134. Access node 115 is operatively coupled to network 120. Access node 125 is operatively coupled to network 120. Wireless device 130 is operatively coupled to access node 115 via wireless link 145. Wireless device 134 is operatively coupled to access node 115 via a wireless link 146. Wireless device 130 can be operatively coupled to access node 125 via wireless link 141. Wireless device 130 can measure a signal strength of access node 125 via wireless link 141 and report this signal strength to access node 115 via wireless link 145. Wireless device 134 can measure a signal strength of access node 125 via wireless link 142 and report this signal strength to access node 115 via wireless link 146.

Access node 115 is illustrated as having coverage area 116 and coverage area 117. Access node 125 is illustrated as having coverage area 126. Coverage area 116 and coverage area 126 overlap in region 156. Coverage area 117 and coverage area 126 overlap in region 157. Wireless device 130 is illustrated in region 156. Wireless device 134 is illustrated in region 157. Thus, it should be understood that wireless device 130 is in a location where it can be served by either access node 115 via wireless link 145 or access node 125 via wireless link 141. Likewise, wireless device 134 is in a location where it can be served by either access node 115 via wireless link 146 or access node 125 via wireless link 142.

Wireless device 131 and wireless device 132 are illustrated in coverage area 116 but not in coverage area 126 or coverage area 117. Wireless device 133 is illustrated in coverage area 117 but not in coverage area 126 or coverage area 116. Thus, it should be understood that wireless devices 131-133 can only be served by access node 115.

Access node 115 and access node 125 are network nodes capable of providing wireless communication to wireless devices 130-134. Access node 115 and/or access node 125 can be, for example, one or more of a base transceiver station, a radio base station, an eNodeB device, or an enhanced eNodeB device. Access node 115 communicates with wireless device 130 via a wireless link. Access node 125 can communicate with wireless device 130 via wireless link 141. Access node 115 communicates with wireless device 134 via a wireless link. Access node 125 can communicate with wireless device 134 via wireless link 142.

Communication system 100 is a communication network that can provide wireless communication to wireless devices 130-134. Network 120 is a communication network that can provide communication between access node 115 and access node 125. Communication system 100 and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and network 120 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX).

Links between elements of communication system 100, can be, for example, twisted pair cable, coaxial cable or fiber optic cable, or combinations thereof. Wireless link 141, wireless link 142, wireless link 145 and/or wireless link 146 can be a radio frequency, microwave, infrared, or other similar signal. Wireless link 141, wireless link 142, wireless link 145 and/or wireless link 146 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless devices 130-134 may be any device, system, combination of devices, or other such communication platform capable of communicating wirelessly with access node 115 and access node 125. Wireless devices 130-134 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 115 and access node 125. Other types of communication platforms are possible.

In an embodiment, communication system 100 (or a processing node therein) performs traffic management functions such as load equalization, offloading, and pre-emption due to call admission control. To perform these traffic management functions, access node 115 may handoff wireless device 130 to access node 125. This reduces the load on access node 115 and increases the load on access node 125. Thus, assuming access node 115 had a greater load than access node 125, after the handover of wireless device 130 is performed, the loads on access node 115 and access node 125 will be more equal after the handover than loads were before the handover. The access node seeking to reduce load (e.g., access node 115) is considered the "source" access node. The access node that may receive the handed-off wireless device is considered the "target" access node.

To perform a traffic management handover, communication system 100 performs three generalized steps: (1) selection of which wireless devices 130-134 among wireless devices 130-134 that are being served by access node 115 are to provide measurement reports on the signal they receive from access node 125; (2) selection of which wireless devices selected in the previous step receive at least a minimum signal strength from access node 125; and, (3) execution of the handover of one or more wireless devices 130-134 from access node 115 to access node 125.

In an embodiment, access node 115 stores a database (a.k.a., "knowledge base") that associates access node 125 to bits transmitted per physical resource block (PRB). In other words, access node 115 uses the bits transmitted per PRB for each wireless device 130-134 as an index to determine whether each of wireless devices 130-134 is likely to be in a coverage area (e.g., coverage area 126) of access node 125.

For example, a low bits transmitted per physical resource block associated with wireless device 130 may mean wireless device 130 is likely to be near the edge of coverage area 116. If wireless device 130 is near the edge of coverage area 116, the database may indicate that wireless device 130 is likely to also be in coverage area 126. Likewise, a low bits transmitted per physical resource block associated with wireless device 134 may mean wireless device 134 is likely to be near the edge of coverage area 117. If wireless device 134 is near the edge of coverage area 117, the database may indicate that wireless device 134 is likely to also be in coverage area 126.

Conversely, a high bits transmitted per physical resource block associated with wireless devices 131-132 may mean wireless devices 131-132 are likely to be far from the edge of coverage area 116. If wireless devices 131-132 far from the edge of coverage area 116, the database may indicate that devices 131-132 are not likely to also be in coverage area 126. A high bits transmitted per physical resource block associated with wireless device 133 may mean wireless device 133 is likely to be far from the edge of coverage area 117. If wireless device 133 is far from the edge of coverage area 117, the database may indicate that wireless device 133 is not likely to also be in coverage area 126.

Wireless devices 130-134 that are closer to access node 115 are more likely to receive good signal strength from access node 115 and this results those wireless devices using a higher modulation and coding scheme (MCS). The higher MCS results in a higher bits transmitted per PRB for those closer wireless devices 130-134. Those wireless devices that are near the edge of a coverage area (e.g., coverage area 116) of access node 115 are more likely to receive a weak signal strength and therefore use a low MCS which results in a lower bits transmitted per PRB. Thus, access node 115 is able to associate the bits transmitted per PRB of a wireless device 130-134 to a likelihood (or a decision) that a wireless device 130-134 is also in a coverage area 126 of access node 125.

Access node 115 also stores in the database an indicator that associates the whether access node 125 is likely to have a better, similar, or weaker signal strength than access node 115. In other words, access node 115 uses the identification of the coverage area of access node 125 as an index to further determine whether that wireless device 130-134 is likely to: (1) receive better signal strength from access node 125 than from access node 115; (2) about the same signal strength from access node 125 and access node 115; or, (3) receive better signal strength from access node 115 than from access node 125. This indicator may be represented by, for example, a variable T where: T=1 for access node 125 likely having better signal strength than access node 115, T=0 for access node 125 and access node 115 likely having similar signal strength, and T=−1 for access node 115 having better signal strength than access node 125.

The information stored in the database by access node 115 can be initially obtained through drive testing. The database can also be adjusted or updated based on measurement reports received from wireless devices 130-134. The bits transmitted per PRB values stored in the database, and the bits transmitted per PRB values used to query the database may be normalized averages.

When access node 115 determines it needs to perform a traffic management handover, access node 115 selects a subset of wireless devices 130-134 to provide measurement reports about the signal strengths associated with access node 125. To select the subset of wireless devices 130-134 to perform measurement reports, access node queries the database with the bits transmitted per PRB associated with each wireless device 130-134. Access node 115 uses the results of the database query to determine which wireless devices 130-134 may be in a coverage area (e.g., coverage area 126) of access node 125. For example, the results of the database query may indicate, based on the bits per PRB associated with wireless device 130 and wireless device 134, that wireless device 130 and wireless device 134 are likely to be in a coverage area of access node 125. Likewise, for example, the results of the database query may indicated, based on the bits per PRB associated with wireless devices 131-133, that wireless devices 131-133 are not likely to be in a coverage area of access node 125.

Access node 115 also receives from the database the indicators of whether access node 125 is likely to have a better, similar, or weaker signal strength than access node 115. For example, once the database indicates a wireless device (e.g., wireless device 130) is likely in a coverage area for access node 125, access node 115 may receive from the database a T value equal to one (T=1).

Access node 115 also knows a current minimum required bitrate for each of the wireless devices 130-134 that access node 115 is serving. Access node 115 selects the ones of wireless devices 130-134 that are to provide measurement reports based on their associated minimum required bitrate, and their associated indicators of whether access node 125 is likely to have a better, similar, or weaker signal strength for that bits transmitted per PRB. In an embodiment, for target access nodes 125 that are indicated to likely have better or similar signal strength, access node 115 selects those wireless devices 130-134 with the highest minimum bitrate requirements to provide measurement reports. For target access nodes 125 that are indicated to likely have weaker signal strength, access node 115 selects those wireless devices 130-134 with the lowest minimum bitrate requirements to provide measurement reports.

For example, if access node 115 received a T=1 value for access node 125, then those wireless devices (e.g., wireless device 130) having high minimum bitrate requirements would be selected to provide measurement reports about the signal strength received from access node 125. In another example, if access node 115 received a T=−1 value for access node 125, then those wireless devices (e.g., wireless device 134) having low minimum bitrate requirements would be selected to provide measurement reports about the signal strength received from access node 125.

Access node 115 may select a predetermined number of wireless devices 130-134 to provide measurement reports. In other words, when T=1 or T=0, access node 115 may select the N number of wireless devices with the N highest minimum bitrate requirements to provide measurement reports. Likewise, when T=−1, access node 115 may select the N number of wireless devices with the N highest minimum bitrate requirements to provide measurement reports.

Figure 2:
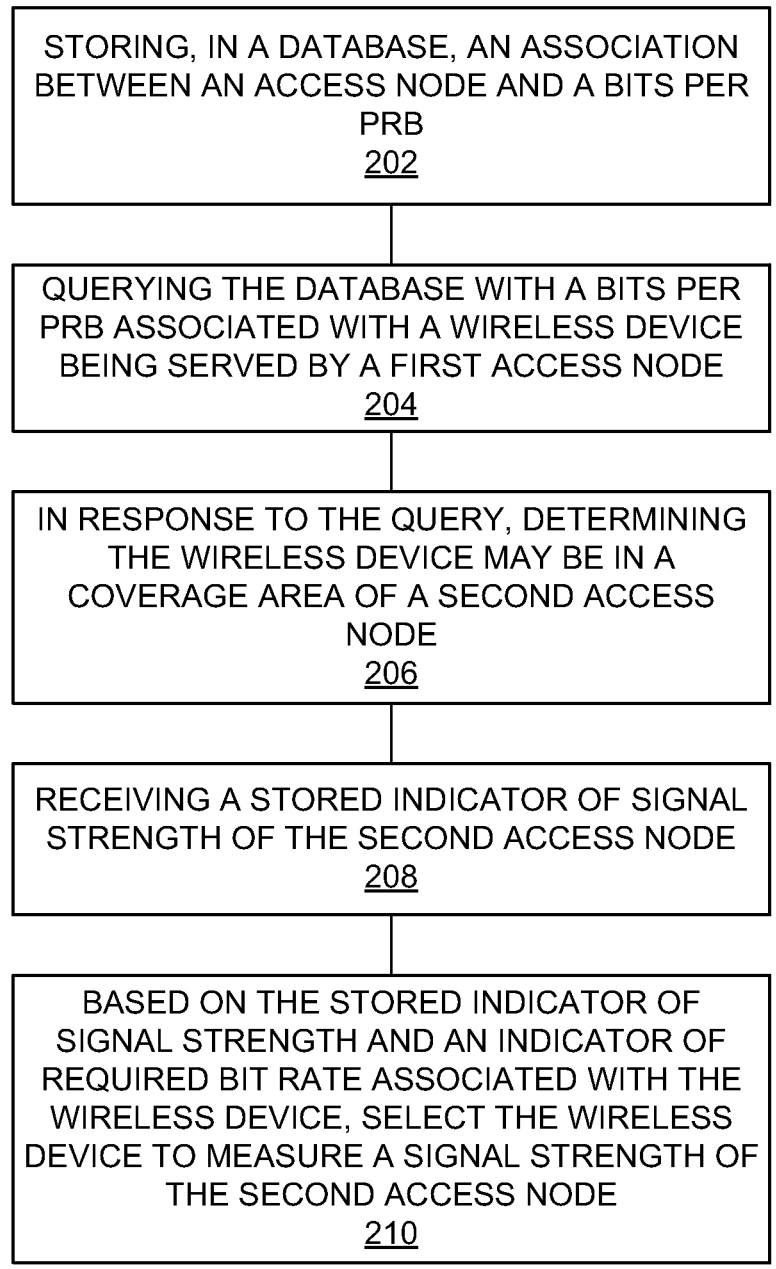
FIG. 2 is a flowchart of a method of selecting a wireless device to send a measurement report.

FIG. 2 is a flowchart of a method of selecting a wireless device to send a measurement report. The steps illustrated in FIG. 2 may be performed by one or more of the elements of communication system 100. An association between an access node and a bits per PRB are stored in a database (202). For example, access node 115 may store an association between a bits transmitted per PRB value and access node 125. In other words, access node 115 may associate certain bits transmitted per PRB values with whether wireless devices 130-134 are likely in a coverage area of access node 125.

The database is queried with a bits per PRB associated with a wireless device being served by a first access node (204). For example, access node 115 may query the database with a bits transmitted per PRB value associated with wireless device 130. In response to the query, it is determined that the wireless device may be in a coverage area of a second access node (206). For example, in response to the results of the database query with the bits per PRB value associated with wireless device 130, access node 115 may determine that wireless device 130 may be in a coverage area of access node 125.

A stored indicator of signal strength of the second access node is received (208). For example, access node 115 may receive, from the database, an indicator of whether access node 125 is likely to have a better, similar, or weaker signal strength than access node 115.

Based on the stored indicator of signal strength, and an indicator of required bitrate associated with the wireless device, the wireless device is selected to measure a signal strength of the second access node (210). For example, based on the indicator of whether access node 125 is likely to have a better, similar, or weaker signal strength than access node 115, and the minimum required bitrate associated with wireless device 130, wireless device 130 may be selected to provide a measurement report about the received signal strength of access node 125.

In an embodiment, if the stored indicator of signal strength indicates the second access node is likely to have a better or similar signal strength than the first access node, a set of wireless devices with higher (e.g., the N highest, where N is greater than or equal to zero) minimum required bitrates are selected. These wireless devices are selected from those wireless devices that the database indicated are likely in a coverage area of the second access node.

If the stored indicator of signal strength indicates the second access node is likely to have a weaker strength than the first access node, a set of wireless devices with lower (e.g., the N lowest, where N is greater than or equal to zero) minimum required bitrates are selected. These wireless devices are selected from those wireless devices that the database indicated are likely in a coverage area of the second access node.

Figure 3:
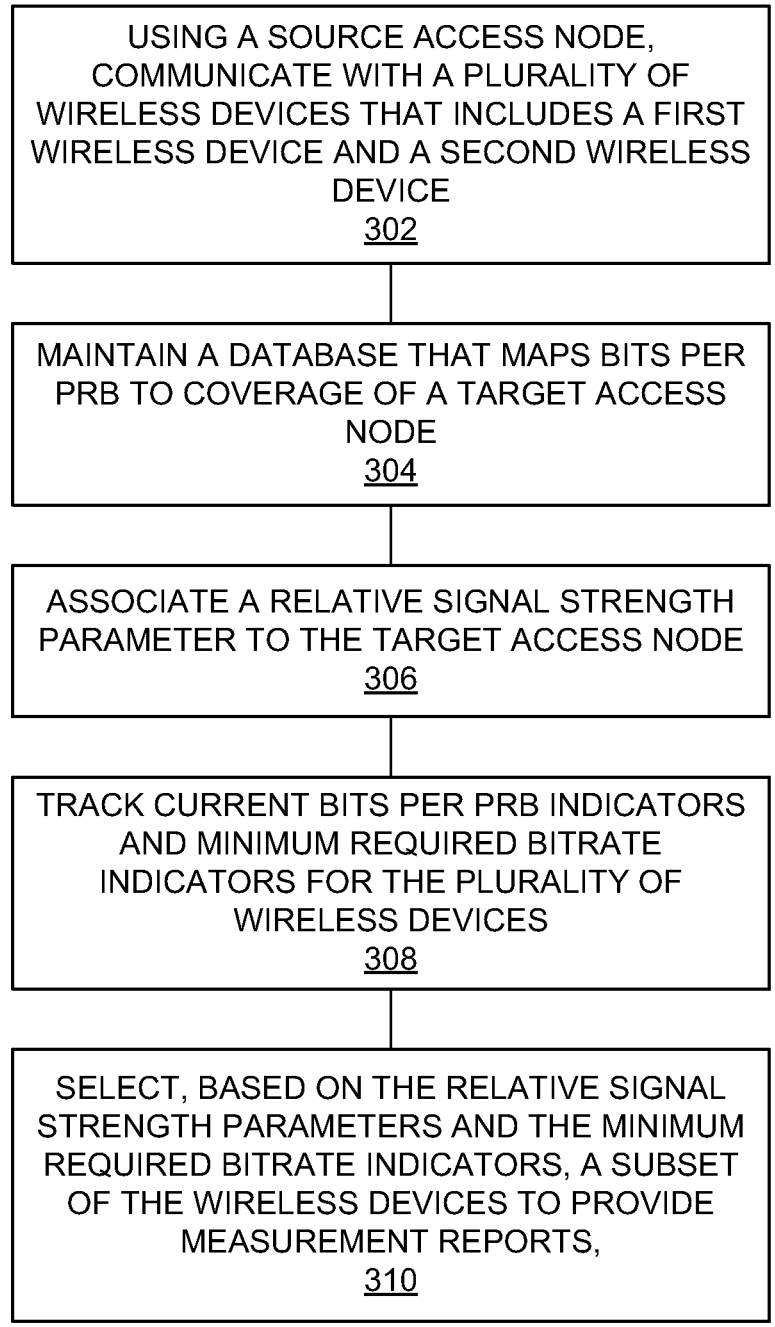
FIG. 3 is a flowchart of a method of operating a communication system.

FIG. 3 is a flowchart of a method of operating a communication system. The steps illustrated in FIG. 3 may be performed by one or more elements of communication system 100. A source access node is used to communicate with a plurality of wireless devices that include a first wireless device and a second wireless device (302). For example, access node 115 may be used to communicate with wireless devices 130-134. A database is maintained that maps bits per PRB to coverage of a target access node (304). For example, access node 115 may maintain a database that maps certain bits per PRB values to coverage area 126—which is a coverage area of access node 125.

A relative signal strength parameter is associated with the target access node (306). For example, access node 115 may associate a relative signal strength parameter which indicates whether access node 125 is likely to have a better, similar, or weaker signal strength than access node 115. This indicator may be represented by, for example, a variable T where: T=1 for access node 125 likely having better signal strength than access node 115, T=0 for access node 125 and access node 115 likely having similar signal strength, and T=−1 for access node 115 having better signal strength than access node 125.

Current bits per PRB indicators and minimum required bitrate indicators are tracked for the plurality of wireless devices (308). For example, access node 115 may track the current bits per PRB and minimum required bitrates of wireless devices 130-134. Based on the relative signal strength parameters and the minimum required bitrate indicators, a subset of the wireless devices are selected to provide measurement reports (310). For example, based on a relative signal strength parameter which indicates that access node 125 is likely to have a better or similar (i.e., T=1 or T=0) signal strength than access node 115, and the minimum required bitrate of wireless device 130, access node 115 may select wireless device 130 to provide a measurement report about the signal strength of access node 125. Access node 115 may select wireless device 130 because it is one of N number of wireless devices 130-134 having the highest minimum required bitrate and are also reported by the database as being likely to be in coverage area 126.

In another example, based on a relative signal strength parameter which indicates that access node 125 is likely to have weaker (i.e., T=−1) signal strength than access node 115, and the minimum required bitrate of wireless device 134, access node 115 may select wireless device 134 to provide a measurement report about the signal strength of access node 125. Access node 115 may select wireless device 134 because it is one of N number of wireless devices 130-134 having the lowest minimum required bitrate and are also reported by the database as being likely to be in coverage area 126.

Figure 4:
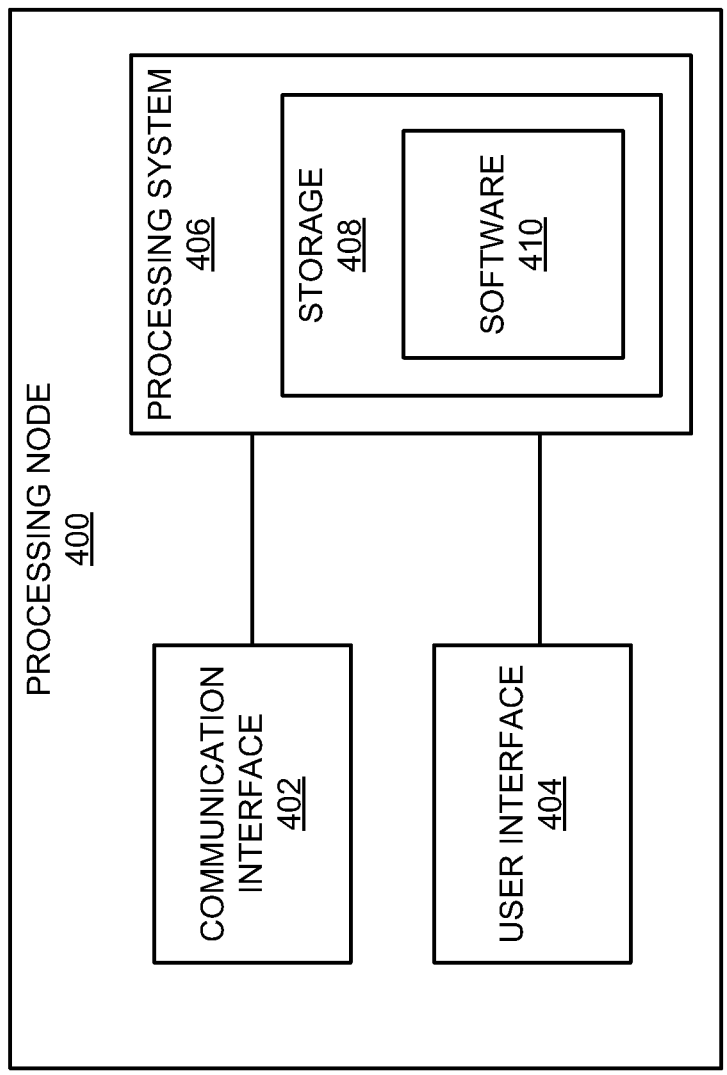
FIG. 4 illustrates a processing node.

FIG. 4 illustrates an exemplary processing node 400 comprising communication interface 402, user interface 404, and processing system 406 in communication with communication interface 402 and user interface 404. Processing node 400 is capable of paging a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include access node 115 and access node 125. Processing node 400 can also be an adjunct or component of a network element, such as an element of network 120, access nodes 115 and/or 125, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting a wireless device to send a measurement report, the method comprising:
   selecting, at a first access node, at least one neighboring access node for traffic offload from the first access node based on a criteria;
   determining, at the first access node, a modulation and coding scheme (MCS) index for each of a plurality of wireless devices served by the first access node, the MCS index being used to determine a likelihood that at least one wireless device is located within a coverage area of the selected neighboring access node, wherein a low MCS index indicates that the wireless device is located at an edge of the coverage area of the first access node and within the coverage area of the selected neighboring access node, wherein a high MCS index indicates that the wireless device is located within a full strength coverage area of the first access node;
   mapping, at the first access node, the MCS index of the at least one wireless device to a stored signal strength of the neighboring access node; and
   instructing, via the first access node, the at least one wireless device to provide a measurement report of a current signal strength of the neighboring access node.

2. The method of claim 1, wherein the criteria corresponds to the neighboring access node having a signal strength that is stronger or equivalent to a signal strength of the first access node.

3. The method of claim 1, wherein the criteria corresponds to the neighboring access node having a signal strength that is weaker than a signal strength of the first access node.

4. A communication system, comprising:
   a processing node comprising a processor and a transmitter, the processing node configured to:
   select at least one neighboring access node for offloading traffic from a first access node based on a criteria;
   determine a modulation and coding scheme (MCS) index for each of a plurality of wireless devices served by the first access node, wherein the MCS index is used to define a location of at least one wireless device in a coverage area of the selected neighboring access node;
   map the MCS index of the at least one wireless device to a stored signal strength of the neighboring access node; and
   instruct the at least one wireless device to provide a measurement report of a current signal strength of the neighboring access node,
   wherein the criteria corresponds to the neighboring access node having a signal strength that is stronger or equivalent to a signal strength of the first access node, and
   wherein the first access node selects the at least one wireless device based on a required bit rate that is higher compared to a required bit rate of each of the other wireless devices of the plurality of wireless devices.

5. The communication system of claim 4, wherein the first access node selects at least one second wireless device based on a determined minimum bit rate requirement that is lower compared to a minimum bit rate requirement of each of the other plurality of wireless devices.

6. The communication system of claim 4, wherein a high MCS index indicates that the wireless device is located in a full strength coverage area of the first access node and a low MCS index indicates that the wireless device is located at an edge of the coverage area of the first access node.

7. The communication system of claim 6, wherein the MCS index of each of the plurality of wireless devices is used to determine a likelihood that the wireless device is in the coverage area of the selected neighboring access node.

8. A method of operating a communication system, comprising:
   selecting, at a first access node, at least one target access node for offloading traffic from a source access node;
   tracking, at the first access node, a modulation and coding scheme (MCS) and a minimum required bit rate for each of a plurality of wireless devices, wherein the MCS defines a location of the wireless device in a coverage area of the selected target access node; and
   selecting, at the first access node, a subset of the plurality of wireless devices to provide measurement reports based on the tracked MCS and the minimum required bit rate.

9. The method of claim 8, wherein the subset is selected as a predetermined number of wireless devices having the highest minimum required bit rate.

10. The method of claim 9, wherein the subset is selected if the selected target access node has a signal strength that is stronger or equivalent to a signal strength of the source access node.

11. The method of claim 8, wherein the subset is selected as a predetermined number of wireless devices having the lowest minimum required bit rate.

12. The method of claim 11, wherein the subset is selected if the selected target access node has a signal strength that is weaker than a signal strength of the source access node.

* * * * *